United States Patent
Asahara

(10) Patent No.: US 8,321,877 B2
(45) Date of Patent: Nov. 27, 2012

(54) IMAGE FORMING APPARATUS, CONTROL METHOD THEREFOR, AND STORAGE MEDIUM STORING CONTROL PROGRAM THEREFOR

(75) Inventor: Hideo Asahara, Yokohama (JP)

(73) Assignee: Canon Kabushiki Kaisha (JP)

( * ) Notice: Subject to any disclaimer, the term of this patent is extended or adjusted under 35 U.S.C. 154(b) by 935 days.

(21) Appl. No.: 12/364,869

(22) Filed: Feb. 3, 2009

(65) Prior Publication Data

US 2009/0199214 A1 Aug. 6, 2009

(30) Foreign Application Priority Data

Feb. 4, 2008 (JP) ................................ 2008-023875

(51) Int. Cl.
*G06F 9/54* (2006.01)
(52) U.S. Cl. ........... 719/320; 715/226; 714/49; 358/442
(58) Field of Classification Search .................. 719/320; 715/226; 714/49; 358/442
See application file for complete search history.

(56) References Cited

U.S. PATENT DOCUMENTS

| | | | |
|---|---|---|---|
| 2005/0114766 A1* | 5/2005 | Yamamoto ................. | 715/527 |
| 2006/0031238 A1* | 2/2006 | Baba ........................ | 707/100 |
| 2006/0044580 A1* | 3/2006 | Maeda ...................... | 358/1.9 |
| 2006/0092097 A1* | 5/2006 | Reddy et al. .............. | 345/2.1 |
| 2006/0095542 A1* | 5/2006 | Reddy et al. .............. | 709/217 |
| 2006/0168509 A1* | 7/2006 | Boss et al. ................. | 715/507 |
| 2007/0091010 A1* | 4/2007 | Richardson et al. ....... | 345/2.1 |
| 2008/0022212 A1* | 1/2008 | Kodimer et al. ........... | 715/744 |
| 2009/0122358 A1* | 5/2009 | Moore et al. .............. | 358/473 |

FOREIGN PATENT DOCUMENTS

JP 5-246111 A 9/1993
JP 8-329338 A 12/1996

* cited by examiner

*Primary Examiner* — S. Sough
*Assistant Examiner* — Brian Wathen
(74) *Attorney, Agent, or Firm* — Rossi, Kimms & McDowell LLP

(57) ABSTRACT

An image processing apparatus capable of previously checking a setting mistake when a macro button is generated and preventing a macro using a reserved word from being inappropriately executed. A macro acquisition unit obtains the macro. A user information acquisition unit obtains user information associated with a user of the image processing apparatus. A replacing unit, when the macro obtained by the macro acquisition unit is a macro including a reserved word that is to be replaced with a portion of the user information, replaces the reserved word with the portion of the user information obtained by the user information acquisition unit. A check unit checks whether the macro replaced by the replacing unit can be normally executed. A notification unit notifies a check result of the check unit to a previously defined user.

13 Claims, 11 Drawing Sheets

FIG. 4

```
<Macro id="1" owner=" userA" domain=" domainA" public=" domainA¥userA,domainA¥userB,domainA¥GroupC">
  <Scan/>
  <Send>
    <address id="1">
      <protocol>FTP</protocol>
      <sever>sever</sever>
      <folder>pat¥comment¥%FREE_WORDS%</folder>
      <user>%USER_NAME%</user>
      <password>password</password>
    </address>
  </Send>
</Macro>
```

FIG. 5

| RESERVED WORD 501 | PROPERTY FOR REPLACING 502 |
|---|---|
| %USER_NAME% | Uid |
| %USER_DOMAIN% | Domain |
| %USER_EMAIL_ADDR% | E-mail |
| %FREE_WORDS% | Free Words |

Figure 12:
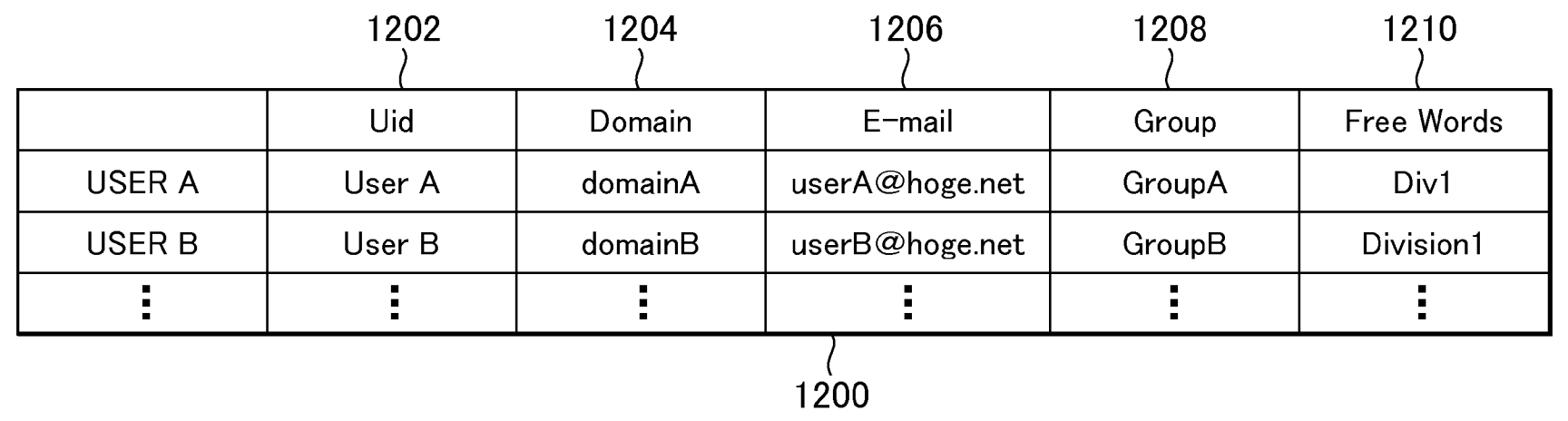

| Uid | Domain | E-mail | Group | Free Words |
|---|---|---|---|---|
| User A | domainA | userA@hoge.net | GroupA | Div1 |
| User B | domainB | userB@hoge.net | GroupB | Division1 |
| ... | ... | ... | ... | ... |

USER A
USER B
...

1202, 1204, 1206, 1208, 1210, 1200

IMAGE FORMING APPARATUS, CONTROL METHOD THEREFOR, AND STORAGE MEDIUM STORING CONTROL PROGRAM THEREFOR

BACKGROUND OF THE INVENTION

1. Field of the Invention

The present invention relates to an image forming apparatus (an image processing apparatus) having a function to store a setting value relating to an image processing job as a script and to load and execute the script according to an instruction of a user, a control method therefor, and a storage medium storing a control program therefor.

2. Description of the Related Art

A recent multifunctional apparatus (a multifunctional printer) has a printer function, a FAX transmitting and receiving function, an e-mail transmitting and receiving function, and the like in addition to a copy function, thus improving operational efficiency.

The more functions the multifunctional apparatus has, the more items must be set by a user on an operation unit of the multifunctional apparatus. To cope with such situation, a macro function is suggested to record operations performed by the user and assign the recorded content to one operation key, thus improving operability thereof.

For example, as the multifunctional apparatus having the macro function, there exist a first multifunctional apparatus suggested in Japanese Laid-Open Patent Publication (Kokai) No. H05-246111 and a second multifunctional apparatus suggested in Japanese Laid-Open Patent Publication (Kokai) No. H08-329338.

In the first multifunctional apparatus, the sequence of operation keys sequentially pressed down is registered as a macro (a processing procedure) using key codes generated when the operation keys are pressed down. When a call key corresponding to this macro is pressed down, this macro is executed.

On the other hand, in the second multifunctional apparatus, while the multifunctional apparatus is caused to perform actual operations, the executed processings therein are registered as a macro, so that a mistake in the registration of the macro can be prevented.

The macro function is a very convenient function to reduce operational cost of the multifunctional apparatus, but great many macros should be prepared depending on purposes. Especially, there exists a case where only some settings are replaced by a user, and a solution has been sought.

For example, when using a macro to read a document and to transmit digital data thereof to a folder of each user, the number of necessary macros reaches the number of users to provide the macros to all users, which increases difficulty to generate and manage the macros.

A usage of a reserved word representing property information of a user as a setting value of a job can be considered as a technique to combine a plurality of macros as many as the number of users into one macro. For example, it is a technique to set a reserved word representing a user ID in combination with a destination, and to execute the macro after replacing the reserved word with the user ID of a user giving an instruction to execute the macro when the reserved word is detected during execution.

However, depending on the type of a user property, there may be a case where an administrator of user information fails to set the property based on a correct policy or each user entrusted to set his or her own property fails to correctly set the property.

Thus, if the macro is generated on the assumption that the property is correctly set, there may be a case where the macro is executed under the settings not intended by a creator of macro, and there exists a problem that the creator of the macro and a user instructing to execute the macro do not notice that the macro is executed under the unintended settings.

In addition, even if the properties of each user are correctly set, there exists a case where the reserved is replaced with an inappropriate setting value depending on the used setting value, and there exists a problem that the creator of macro does not notice that the macro is inappropriately executed.

SUMMARY OF THE INVENTION

The present invention provides an image forming apparatus, a control method therefor, and a storage medium storing a control program therefor capable of previously checking a setting mistake when a macro button is generated and capable of preventing a macro using a reserved word from being inappropriately executed. In addition, the present invention provides the image forming apparatus, the control method therefor, and the recording medium recorded with the control program therefor capable of isolating a cause of an error in a case where an execution error of the macro occurs.

Accordingly, the present invention provides an image processing apparatus capable of executing a plurality of functions including an image processing and capable of executing a processing based on a macro indicating a content of the processing including a combination of the plurality of functions, the image processing apparatus comprising a macro acquisition unit adapted to obtain the macro, a user information acquisition unit adapted to obtain user information associated with a user of the image processing apparatus, a replacing unit adapted to, when the macro obtained by the macro acquisition unit is a macro including a reserved word that is to be replaced with at least a portion of the user information, replace the reserved word with the at least a portion of the user information obtained by the user information acquisition unit, a check unit adapted to check whether the macro replaced by the replacing unit can be normally executed; and a notification unit adapted to notify a check result of the check unit to a previously defined user.

Accordingly, the present invention provides an image processing apparatus capable of executing a plurality of functions including an image processing and capable of executing a processing based on a macro indicating a content of the processing including a combination of the plurality of functions, the image processing apparatus comprising a user identification unit adapted to identify a user who operates the image processing apparatus, a reception unit adapted to receive an instruction for executing the macro from the user identified by the user identification unit, a user information acquisition unit adapted to obtain user information associated with the user identified by the user identification unit, a replacing unit adapted to, when the macro whose execution instruction is received by the reception unit is a macro including the reserved word that is to be replaced with at least a portion of the user information, replace the reserved word with the at least a portion of information included in the user information obtained by the user information acquisition unit, a macro execution unit adapted to execute a processing based on the macro replaced by the replacing unit, and a notification unit adapted to, when an error occurs in the processing executed by the macro execution unit, notify the occurrence of the error, wherein the notification unit changes a recipient of the notification depending on whether or not the error is caused due to the replacing of the reserved word by the replacing unit.

Accordingly, the present invention provides a control method for an image processing apparatus capable of executing a plurality of functions including an image processing and capable of executing a processing based on a macro indicating a content of the processing including a combination of the plurality of functions, the control method comprising a macro acquisition step for obtaining a macro, a user information acquisition step for obtaining user information associated with a user of the image processing apparatus, a replacing step for replacing a reserved word with at least a portion of the user information obtained in the user information acquisition step when the macro obtained in the macro acquisition step is a macro including the reserved word that is to be replaced with the at least a portion of the user information, a check step for checking whether the macro replaced in the replacing step can be normally executed, and a notification step for notifying a check result in the check step to a predetermined user.

Accordingly, the present invention provides a control method for an image processing apparatus capable of executing a plurality of functions including an image processing and capable of executing a processing based on a macro indicating a content of the processing including a combination of the plurality of functions, the control method comprising a user identification step for identifying a user who operates the image processing apparatus, a reception step for receiving an instruction to execute the macro from the user identified in the user identification step, a user information acquisition step for obtaining user information associated with the user identified in the user identification step, a replacing step for replacing a reserved word with at least a portion of information included in the user information obtained in the user information acquisition step when the macro whose execution instruction is received in the reception step is a macro including the reserved word that is to be replaced with at least a portion of the user information, a macro execution step for executing a processing based on the macro replaced in the replacing step, and a notification step for notifying an occurrence of an error when the error occurs in an execution of the processing in the macro execution step, wherein the notification step changes a recipient of the notification depending on whether or not the error is caused due to the replacing of the reserved word in the replacing step.

Accordingly, the present invention provides a computer-readable storage medium storing a control program executing a control method for an image processing apparatus capable of executing a plurality of functions including an image processing and capable of executing a processing based on a macro indicating a content of the processing including a combination of the plurality of functions, the control method comprising a macro acquisition step for obtaining a macro, a user information acquisition step for obtaining user information associated with a user of the image processing apparatus, a replacing step for replacing a reserved word with at least a portion of the user information obtained in the user information acquisition step when the macro obtained in the macro acquisition step is a macro including the reserved word that is to be replaced with the at least a portion of the user information, a check step for checking whether the macro replaced in the replacing step can be normally executed, and a notification step for notifying a check result in the check step to a predetermined user.

Accordingly, the present invention provides a computer-readable storage medium storing a control program executing a control method for an image processing apparatus capable of executing a plurality of functions including an image processing and capable of executing a processing based on a macro indicating a content of the processing including a combination of the plurality of functions, the control method comprising a user identification step for identifying a user who operates the image processing apparatus, a reception step for receiving an instruction to execute the macro from the user identified in the user identification step, a user information acquisition step for obtaining user information associated with the user identified in the user identification step, a replacing step for replacing a reserved word with at least a portion of information included in the user information obtained in the user information acquisition step when the macro whose execution instruction is received in the reception step is a macro including the reserved word that is to be replaced with at least a portion of the user information, a macro execution step for executing a processing based on the macro replaced in the replacing step, and a notification step for notifying an occurrence of an error when the error occurs in an execution of the processing in the macro execution step, wherein the notification step changes a recipient of the notification depending on whether or not the error is caused due to the replacing of the reserved word in the replacing step.

According to the present invention, in an image forming apparatus capable of registering and executing a macro button using a reserved word representing property information of a user, a setting mistake can be previously checked when the button is generated, and the macro using the reserved word can be prevented from not being correctly executed. In addition, in a case where an error occurs in an execution of the macro, a cause of the error can be isolated, so that the error can be swiftly taken care of.

The features and advantages of the invention will become more apparent from the following detailed description taken in conjunction with the accompanying drawings.

BRIEF DESCRIPTION OF THE DRAWINGS

FIG. 4 is a figure showing an example of a macro used in the multifunctional apparatus having the software configuration of FIG. 3.

FIG. 5 is a figure showing an example of a table showing a relationship of correspondence between reserved words and user property information used in the multifunctional apparatus having the software configuration of FIG. 3.

FIG. 6 is a figure showing an example of a user interface for setting a destination including the reserved word used in the multifunctional apparatus having the software configuration of FIG. 3.

FIG. 12 is a figure showing an example of user property information stored in a user administration server of FIG. 1.

DESCRIPTION OF THE PREFERRED EMBODIMENTS

The embodiments according to the present invention will be hereinafter described in detail with reference to the figures.

First Embodiment

Figure 1:
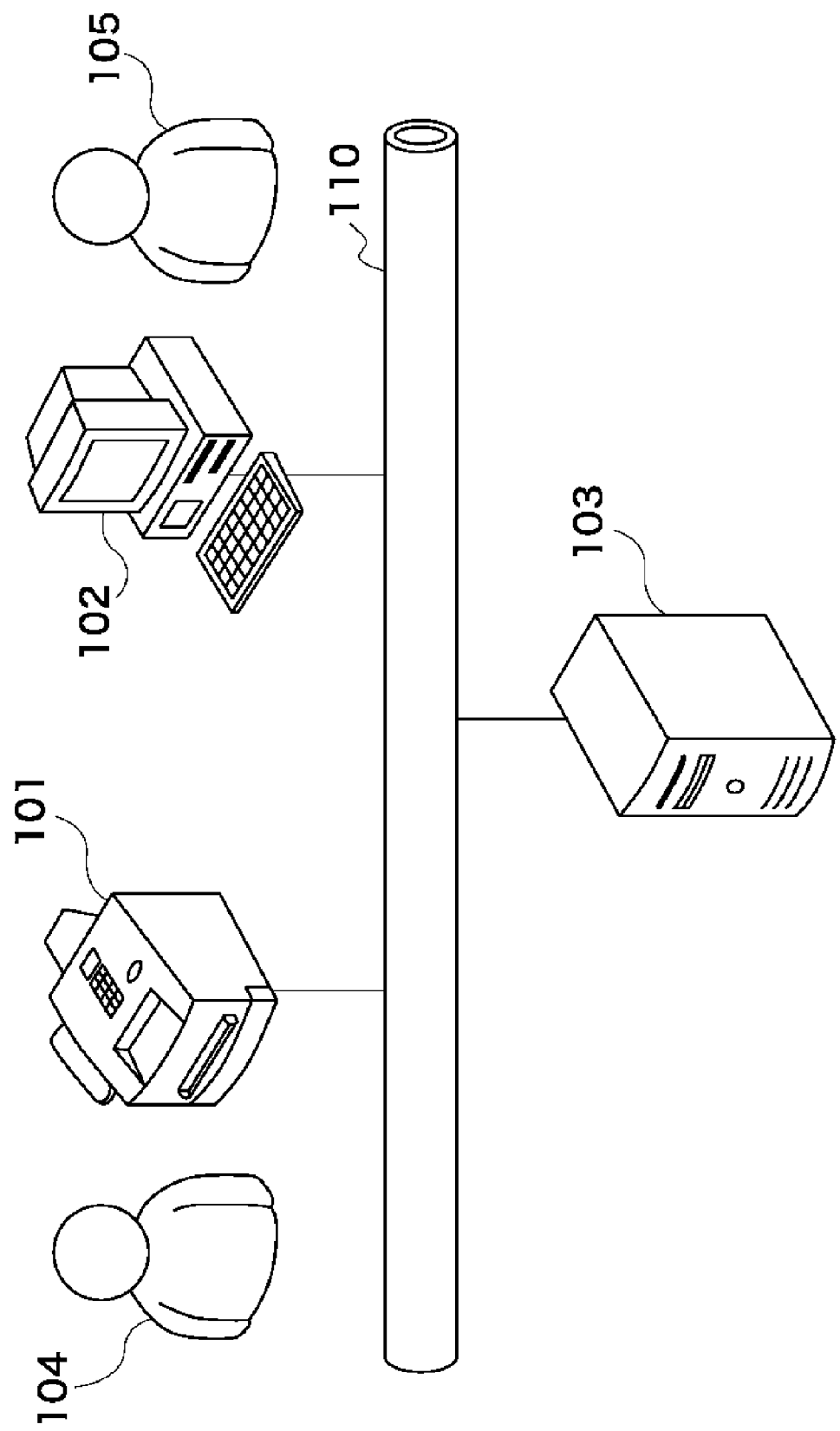
FIG. 1 is a network configuration diagram showing a network with external apparatuses and an image forming apparatus according to a first embodiment are connected.

FIG. 1 is a network configuration diagram showing a network with external apparatuses and an image forming apparatus according to a first embodiment are connected.

A multifunctional apparatus 101 as an example of an image forming apparatus, a host computer 102, and a user administration server 103 are all connected to a LAN 110 and can communicate with each other.

A user 104 operates the multifunctional apparatus 101. A user 105 operates the user administration server 103 via the host computer 102.

The user administration server 103 has a large capacity storage (a storage device such as a hard disk) in the inside thereof, and user property information (also referred to as user information) is stored therein. The user property information will be later described in detail.

The present embodiment is structured to store the user property information in the user administration server 103 and to allow the multifunctional apparatus 101 to refer to the user property information via the LAN 110, but may be structured in other ways. For example, it may be structured to store the user information in the storage device equipped in the multifunctional apparatus 101 and to refer to the user information as necessary.

The present embodiment is structured to allow the user 105 to manipulate the user administration server 103 via the host computer 102, but may be structured in other ways. For example, the user administration server 103 may be equipped with its own user interface to be directly manipulated by the user.

Figure 2:
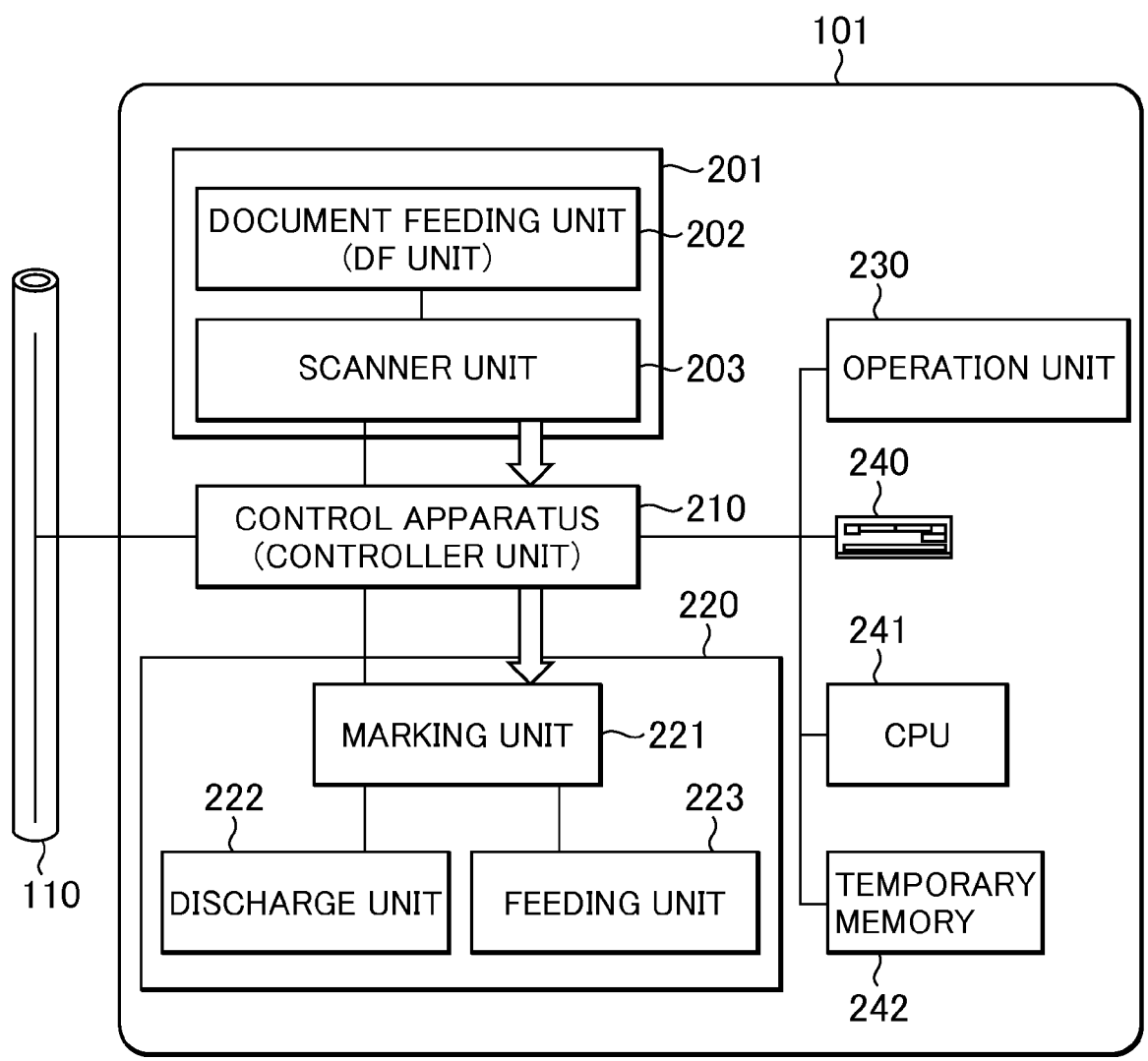
FIG. 2 is a hardware configuration diagram of the multifunctional apparatus of FIG. 1.

FIG. 2 is a hardware configuration diagram of the multifunctional apparatus of FIG. 1.

In FIG. 2, a reader device 201 optically reads a document image and converts the image into image data. The reader device 201 includes a document feeding unit 202 having a function to feed a document sheet, and a scanner unit 203 having a function to read the feeding document. The reader device 201 may not have the document feeding unit 202. In such case, the document is placed on a platen glass, and the document image is read by moving a sensor in the scanner unit 203.

A printer device 220 feeds a recording sheet, prints the image data thereon as a visible image, and discharges the recording sheet to the outside of the device. The printer device 220 includes a marking unit 221 for transferring and fixing the image data on the recording sheet, a discharge unit 222 for discharging the printed recording sheet to the outside of the apparatus upon sorting and stapling the recording sheet, and a feeding unit 223 having multiple types of recording sheet cassettes.

A control device 210 controls the entire multifunctional apparatus 101. The control device 210 is electrically connected to the reader device 201 and the printer device 220, and is further connected to the LAN 110.

The control device 210 provides a copy function by controlling the reader device 201 to read the image data of the document and by controlling the printer device 220 to output the image data on the recording sheet. In addition, the control device 210 converts the image data read by the reader device 201 into code data, and provides a network scanner function for transmitting the code data to the host computer 102 via the LAN 110.

In addition, the control device 210 provides a box scan function for registering the image data read by the reader device 201 to a storage service, referred to as a box, equipped in an HDD 240.

Furthermore, the control device 210 converts the code data, received from the host computer 102 via the LAN 110, into image data, and provides a printer function for outputting the image data to the printer device 220.

An operation unit 230 has a liquid crystal display unit, a touch panel input device affixed to the liquid crystal display unit, and multiple hard keys, and provides a user interface for allowing a user to perform various operations. A signal inputted by the touch panel or the hard key is transmitted to the control device 210. The liquid crystal display unit displays image data sent from the control device 210.

Software for the above-described operation is saved in the HDD 240, and is loaded to a temporary memory 242 during execution and is executed by the CPU 241. The temporary memory 242 is made up with a RAM and the like. The CPU 241 and the temporary memory 242 may also be arranged within the control device 210.

The present embodiment is structured to hold the software in the HDD 240, but may be structured in other ways. For example, the software may also be held in a non-volatile memory such as a ROM and the like.

Herein, the user property information stored in the user administration server 103 will be described. The user property information is information about users who use various apparatuses including the multifunctional apparatus 101 on the LAN 110.

FIG. 12 shows an example of the user property information stored and managed in the user administration server 103. User property information 1200 includes multiple records registered for each user. Each record has a Uid field 1202 in which an ID for uniquely specifying a user is stored, a Domain field 1204 in which a network domain to which the user belongs is stored, an E-mail field 1206 in which an e-mail address of the user is stored, a Group field 1208 in which a group to which the user belongs is stored, and a Free Word field 1210 in which a free entry item is stored. Detailed information set in each of these items 1202 to 1210 is called a property. The user property information may also include information other than this. For example, in a case where the user administration server has a user authentication function, an item for setting a password for the user authentication may be included. The entire set of properties of multiple users as shown in FIG. 12, namely, all the information shown by numeral 1200, may be called the user property information, or an extract of properties about only some of the users thereamong may also be called the user property information.

Figure 3:
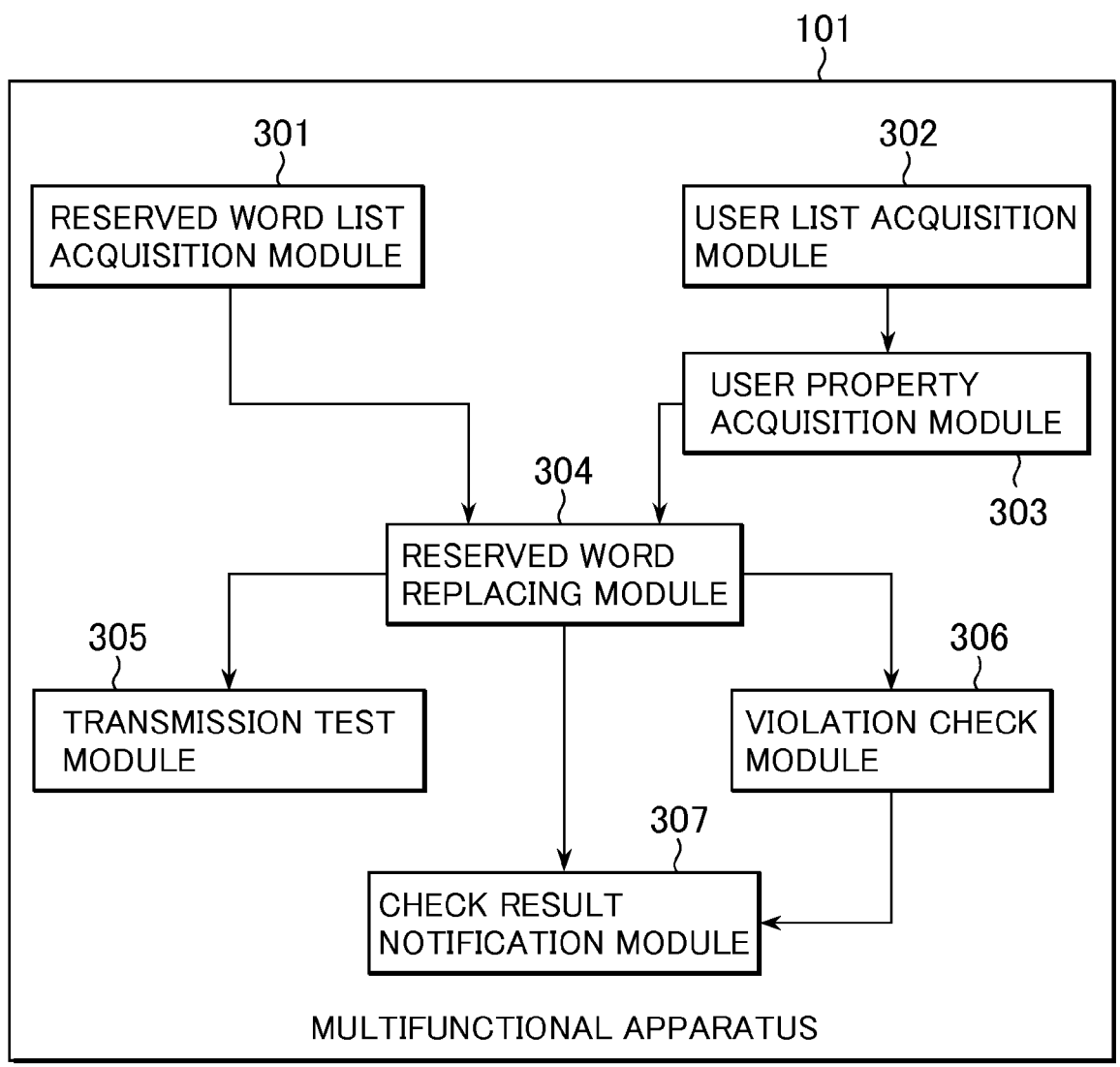
FIG. 3 is a block diagram showing a first embodiment of a software configuration of the multifunctional apparatus of FIG. 1.

FIG. 3 is a block diagram showing a first embodiment of a software configuration of the multifunctional apparatus of FIG. 1. Each of modules 301 to 307 shown in FIG. 3 is a program executed by the CPU 241 of the multifunctional apparatus.

As a precondition of a description of the software configuration, a macro and a reserved word are explained first.

The macro according to the present embodiment is data describing a processing content to be executed by the multifunctional apparatus 101. The macro is recorded in the HDD 240 of the multifunctional apparatus 101. The CPU 241 loads the macro based on an instruction by the user (a macro acquisition unit, a function as a macro obtaining step), interprets the loaded macro, and controls the multifunctional apparatus 101 to execute the processing content described in the macro. Multiple processes capable of being executed by the multifunctional apparatus 101 may be described in the macro. Thus, a processing made up of a combination of various functions of the multifunctional apparatus 101 can be registered as one macro, so that the user can easily give an instruction to execute a complicated processing. FIG. 4 shows an example of data of the macro.

Herein, setting information needed for executing a job is shown in XML format. A description enclosed by a Macro tag denotes one macro. In the example of FIG. 4, a Scan tag denotes an execution of a scan function, and a Send tag denotes an execution of a transmission function.

In the present embodiment, the definition of the macro is indicated in XML, but may be expressed in a format such as CSV, property, and the like.

The reserved word according to the present embodiment is a variable consisting of a specific character string, and is replaced, before executing the macro, with a property corresponding to a user who instructs to execute the macro. The reserved word can be used as a variable in describing data of the macro. Thus, it is not necessary to register multiple similar macros. Multiple reserved words may be prepared.

FIG. 5 shows an example of correspondence information (a reserved word list) showing a relationship of correspondence between the reserved words and items in the user property information 1200. This reserved word list is stored in the HDD (a memory unit) 240 of the multifunctional apparatus 101.

A field of a reserved word 501 shows an example of the reserved words that can be used in the present embodiment. Herein, %USER_NAME%, %USER_DOMAIN%, %USER_EMAIL_ADDR%, and %FREE_WORDS% can be used. In addition, the user properties with which the reserved words are replaced are shown as a property 502 for the replacing processing. Each reserved word is replaced with each item of Uid, Domain, E-mail, Free Words among the user property information. In the XML description example of FIG. 4, the reserved word %USER_NAME% is used in the eighth line. The CPU 241 executes the macro upon substituting a portion of %USER_NAME% with the Uid of the user having instructed to execute this macro.

In the present embodiment, "%" is used as a sign that distinguishes the reserved word, but other letters such as "#", "$", and the like may also be used. Alternatively, the sign may not be used.

FIG. 6 shows an example of a user interface (a display screen displayed on the operation unit 230) for generating the macro including the reserved word defined as described above. The reserved word %FREE_WORDS% is used as a path to a folder. On the other hand, the reserved word %USER_NAME% is used as the user name. The user inputs these reserved words from a keyboard, not shown in the figure.

The present embodiment is structured to allow the user to directly input the reserved word with the keyboard, but may be structured in other ways. For example, the host computer 102 may remotely access the multifunctional apparatus 101, and the reserved word may be input on a web browser on the host computer 102. Alternatively, it may be structured to display a list of the reserved words and input the reserved word by making a selection from the list.

It is assumed in the present embodiment that an administrator having a specific authority can generate the macro.

Next, the software configuration of the multifunctional apparatus 101 will be described.

In FIG. 3, a reserved word list acquisition module 301 obtains a list of reserved words (a list of words registered as the reserved words) held in the multifunctional apparatus 101. The list of reserved words includes information about reserved character strings and information about user properties with which the character strings are replaced. The reserved word list is, for example, structured as shown in FIG. 5.

The user list acquisition module 302 obtains a list of users that may possibly use a certain macro (a list of users that can see or execute the generated macro). The macro is registered with a combination of a user group name and the Uid for distinguishing the user as a scope of publication. Thus, the user list acquisition module 302 obtains this information.

The user list is, for example, structured as shown in FIG. 4. In this macro, users "userA" and "userB" and a user group "GroupC" of the domain A are set as an attribute value "public" of the "Macro" tag.

That is, this means that the users who can use this macro are limited to the users "userA" and "userB" and the user group "GroupC" of the domain A. In this way, the macro can include user identification information that identifies users that may possibly use the macro. The user list acquisition module 302 obtains all the user lists included in that user group from the user administration server 103 (a Group 1208 of FIG. 12). Thus, the user list identifying each user included in the user group is finally obtained in units of users.

In the present embodiment, the scope of publication is defined by the domain name and the user ID or the domain name and the user group name, but may be defined in other methods such as regular expression. Furthermore, the scope of publication may be defined by a combination of other methods.

A user property acquisition module 303 obtains from the user administration server 103 the user property information (the user information) associated with the user obtained by the user list acquisition module 302. The user property acquisition module 303 is an example of a user information acquisition unit. The user property information includes information as shown in FIG. 12.

The present embodiment is structured to selectively obtain only the user property corresponding to the reserved word from the user administration server 103, but may be structured to obtain all the properties set for the users.

A reserved word replacing module (a first check unit) 304 replaces the reserved word with a character string set in the property of the corresponding user in a case where the reserved word is included in a transmission destination. In a case where multiple reserved words are included, all of them are replaced. In a case where no reserved word is included in the transmission destination, the reserved word replacing module 304 does not perform any processing.

A transmission test module (a second check unit) 305 tests whether it is possible to transmit to a destination on which the reserved word replacing module 304 has performed the replacing processing. When the transmission destination is a file destination using a protocol such as FTP, SMB, WebDAV, and the like, a test is performed as to whether a designated folder path exists by accessing the destination.

In the present embodiment, the test limited to the file destination is taken as an example, but the test may be performed with respect to other transmission protocols. For example, a test for facsimile may be performed up to a call tone, and for iFax and e-mail, a transmission test may be performed with a blank mail or test data.

A violation check module (a violation check unit) 306 previously checks whether the property with which the reserved word replacing module 304 replaces the reserved word is in a form capable of being input as a setting value of a job recorded in the macro. That is, it is checked whether the property is in an appropriate form for replacing the reserved word. In addition, the violation check module 306 performs a violation check with respect to the destination replaced by the reserved word replacing module 304. The violation check includes a check for the upper limit of number of letters, a check for the type of usable letters, and a check for function restriction. These rules of violation may be arranged to be different for each reserved word. In such a case, an item for determining the violation rule may be included in the reserved word list.

In a case where the reserved word is not used, a check can be performed when the destination is input. But in a case where the reserved word is used, it becomes possible to perform a check after the reserved word has been replaced, and thus, a violation error may be found in this check.

In the check for the upper limit of number of letters, it is checked whether the number of letters exceeds the upper limit of number of letters that can be set in the transmission destination. For example, if more than 256 letters are set in a file path that allows 256 letters or less to be set, a result of the check becomes an error.

In the check for the type of usable letters, it is checked whether the destination uses a type of letter prohibited to be set in that destination. For example, a result of the check becomes an error in such cases where a two-byte code is used in the e-mail address and where "*" and "/" are used in the file path.

The check for the function restriction supposes an environment where there exists a condition for the destination to be able to be set as a transmission destination. A prohibition to set an e-mail address of a domain outside of the company can be mentioned as an example. Under such environment, it is checked whether the destination applicable to the function restriction has been set. The transmission test module 305 and the violation check module 306 correspond to a check unit for checking whether the replaced macro can be normally executed.

Figure 7:
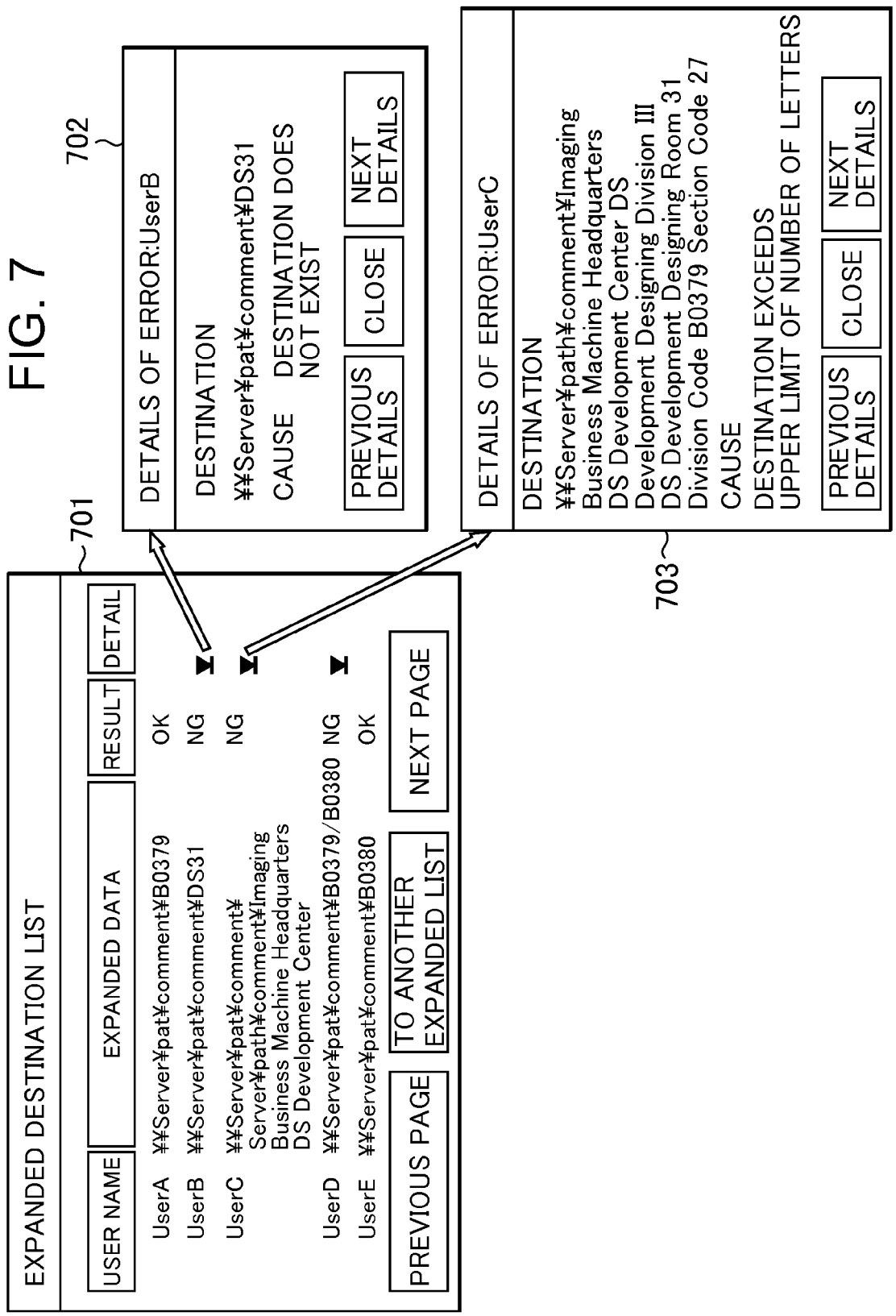
FIG. 7 is a figure showing an example of a user interface of a check result notification module of FIG. 3.

A check result notification module (a notification unit) 307 displays information obtained by the reserved word replacing module 304, the transmission test module 305, and the violation check module 306, in a list form in comparison with the user IDs. A result of check performed by the check module is, for example, displayed as shown in FIG. 7 on the operation unit 230.

A dialog 701 displays destinations, as expanded data, which are obtained by replacing the reserved word by the reserved word replacing module 304 for each user. In addition, results of the checks obtained by the transmission test module 305 and the violation check module 306 are displayed in a form of OK or NG. A link to a more detailed description is prepared for NG items.

Dialogs 702 and 703 are displayed for the NG items of the dialog 701 in a case where the link to the more detailed description is selected. The details of the replaced destination information and the details of the cause why the NG has resulted are displayed.

For example, the dialog 702 shows that the NG is caused due to an error in the transmission test module 305 and that the cause is non-existence of the destination. On the other hand, the dialog 703 shows that the NG is caused due to an error in the violation check module 306 and that the cause is that the destination has exceeded the upper limit of number of letters.

The present embodiment is structured to perform a check with respect to one address, but may be structured in other ways. On the other hand, a method of presentation may be a method other than displaying a list.

Figure 8:
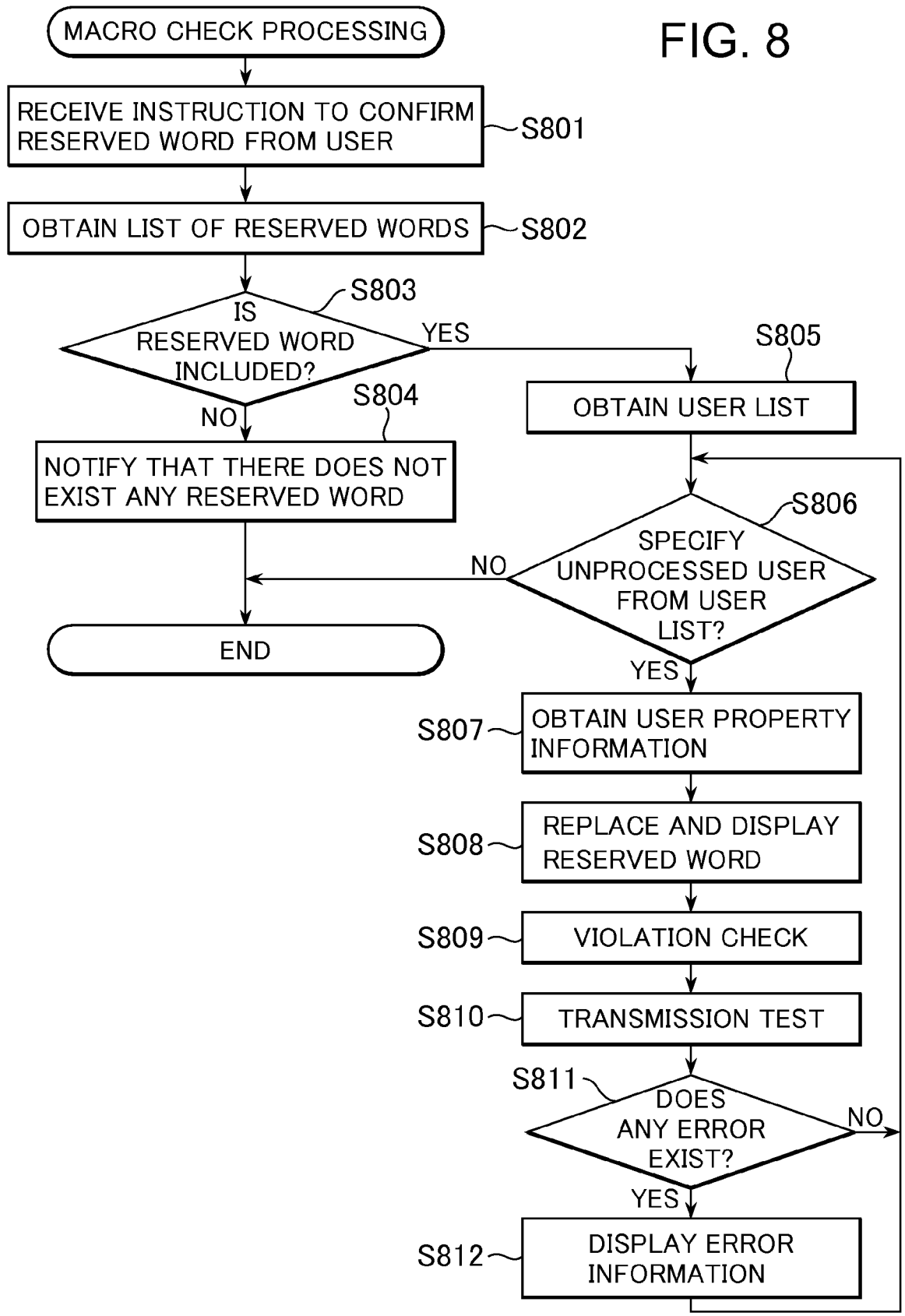
FIG. 8 is a flowchart showing a procedure of a control processing (a macro check processing) in the multifunctional apparatus having the software configuration of FIG. 3.

FIG. 8 is a flowchart showing a procedure of a control processing (a macro check processing) in the multifunctional apparatus having the software configuration of FIG. 3.

The macro check processing is executed by the CPU 241 of the multifunctional apparatus 101.

Figure 9:
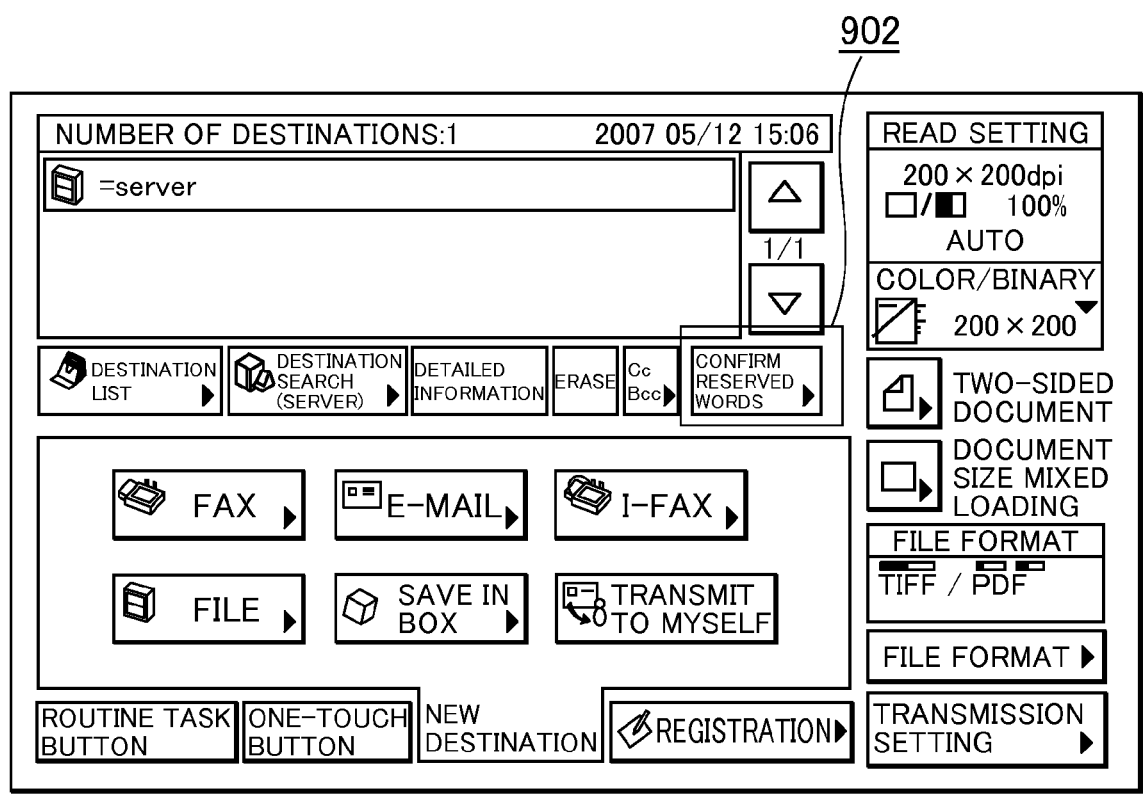
FIG. 9 is a figure showing an example of a user interface for instructing a confirmation of the reserved word used in the multifunctional apparatus having the software configuration of FIG. 3.

The CPU 241 receives from a user an instruction to confirm the reserved word (step S801). Specifically, on an operation screen as shown in FIG. 9 displayed on the operation unit 230, the user presses down a button 902 for instructing a confirmation of the reserved word with one macro selected to be subjected to checking of the reserved word, and the CPU 241 receives the instruction. The CPU 241 receives the instruction of the user, and obtains the macro to be checked from the HDD 240.

Next, the CPU 241 executes the reserved word list acquisition module 301 to obtain a list of the reserved words (step S802).

Next, the CPU 241 determines whether the macro selected in step S801 includes the reserved words obtained in step S802 (step S803).

When the reserved words are not included (No in S803), the CPU 241 displays a message on the operation unit 230 to notify that, as a result of confirmation of the reserved words instructed by the user in step S801, the reserved words are not included in the selected destination and the check could not be performed (step S804), and terminates the macro check processing.

When the reserved word is included (Yes in S803), the CPU 241 executes the user list acquisition module 302 to obtain from the macro a list of users (a user list) that may possibly use the macro (step S805).

Next, the CPU 241 tries to specify one unprocessed user who is not checked in later-described steps S810 and S811 from the user list obtained in step S805, and then, the CPU 241 determines whether the unprocessed user has been specified (step S806). When the unprocessed user is specified (Yes in step S806), the CPU 241 performs processes of step S807 and subsequent steps. When the unprocessed user is not specified (No in step S806), namely, where the processes of step S807 and subsequent steps have been completed with respect to all the users included in the user list obtained in step S805, the CPU 241 terminates the macro check processing.

When the unprocessed user is specified (Yes in step S806), the CPU 241 executes the user property acquisition module 303 to obtain the user property information of the specified user (step S807, a user information acquisition step). Herein, all the user property information of the user may be obtained, or only the property corresponding to the reserved word designated in the macro may be obtained. In step S807, the user property information may be obtained from the user administration server 103. Alternatively, not only the user list but also the user property information may be previously obtained and temporarily stored to the HDD 240 in step S805, and the user property information may be obtained from the HDD 240 in step S807.

Next, the CPU 241 executes the reserved word replacing module 304 to replace the reserved word detected (determined) in step S803 with the property obtained in step S807, and presents the replaced destination information to a creator of macro by displaying the information on the operation unit 230 (step S808, a replacing step).

Next, the CPU 241 executes the violation check module 306 to perform a violation check of the destination information, in which the reserved words have been replaced, generated in step S808 (step S809).

Next, the CPU 241 executes the transmission test module 305 to perform a transmission test of the destination information, in which the reserved words have been replaced, generated in step S808 (step S810). Steps S809 and S810 correspond to a check step for checking whether the replaced macro can be normally executed.

Next, the CPU 241 determines whether any error has been detected in steps S809 and S810 (step S811). When no error has been detected (No in step S811), the flow returns to step S806 to perform the processing for a next user. When an error has been detected (Yes in step S811), error information is presented to a user such as the creator of macro by displaying the error information on the operation unit 230 (step S812, a notification step), and the flow returns to step S806 to perform the processing for a next user.

As hereinabove described, according to the first embodiment, the creator of macro can check the destination information, in which the reserved words have been replaced, during generation of the macro. In addition, it can be automatically checked whether the destination, in which the reserved words have been replaced, actually exists. In addition, it can be checked whether the destination, in which the reserved words have been replaced, violates any rule for the transmission destination.

Second Embodiment

Next, the second embodiment will be described.

In the second embodiment, a hardware configuration of the multifunctional apparatus and a network configuration with which the multifunctional apparatus and an external apparatus are connected are the same as the first embodiment. Thus, the description thereabout is omitted.

The multifunctional apparatus according to the first embodiment checks whether the macro using the reserved word is correctly executed before the macro is executed. In contrast, in a case where the macro is actually executed and an error occurs, the multifunctional apparatus according to the second embodiment notifies to the user whether the cause of the error lies in the user property information with which the reserved word has been replaced or whether the error is caused due to other reasons. Then, in a case where the cause of the error lies in the user property information with which the reserved word has been replaced, the multifunctional apparatus according to the second embodiment notifies an occurrence of the error to not only the user having instructed to execute the macro and the administrator who has created the macro but also the administrator who manages the user property information.

Figure 10:
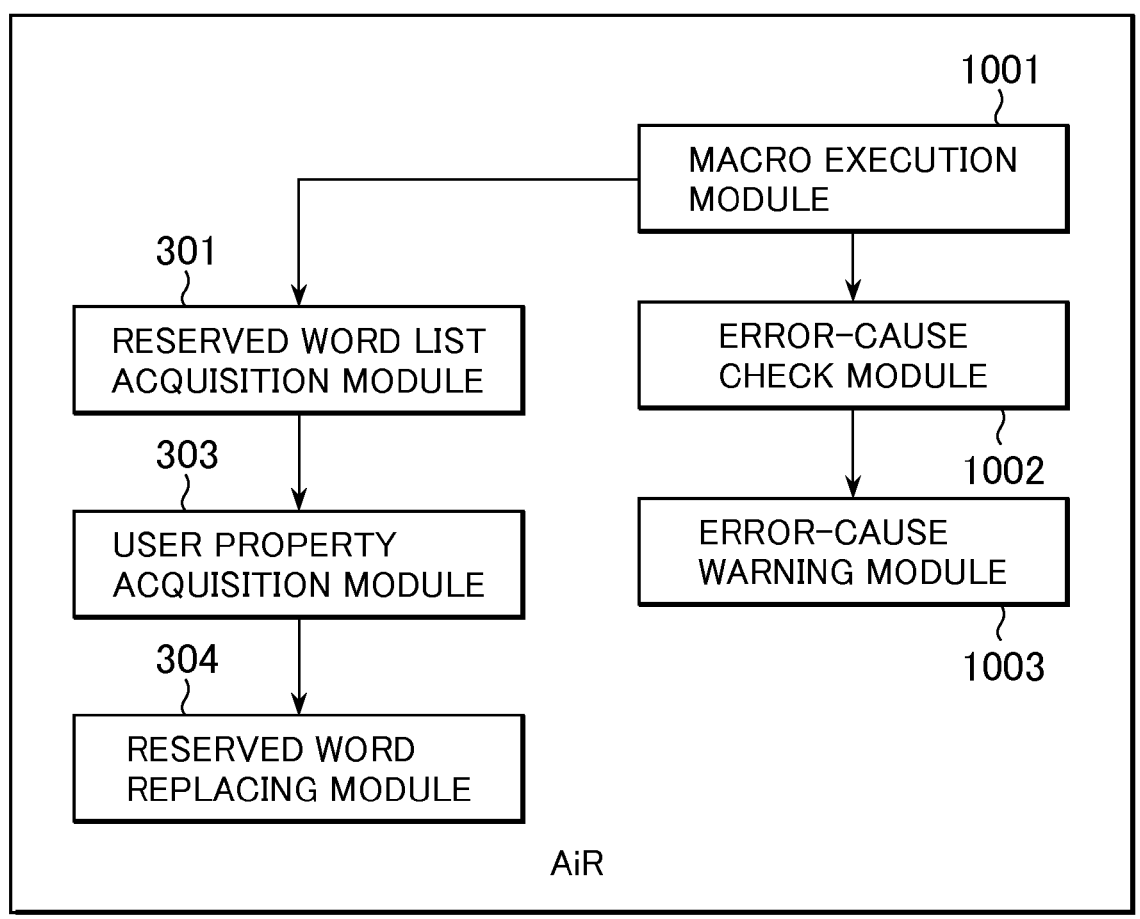
FIG. 10 is a block diagram showing a second embodiment of the software configuration of the multifunctional apparatus of FIG. 1.

FIG. 10 is a block diagram showing the software configuration of the multifunctional apparatus according to the second embodiment.

The same reference numerals are given to the same modules as the first embodiment in FIG. 3, and the duplicate description is omitted. That is, the reserved word list acquisition module 301, the user property acquisition module (a user information acquisition unit) 303, and the reserved word replacing module (a replacing unit) 304 will not be explained.

In FIG. 10, a macro execution module (a macro execution unit) 1001 executes the macro according to the instruction of the user received by a reception unit, not shown in the figure. For example, the macro execution module 1001 executes the job upon reading macro data expressed in XML as shown in FIG. 4.

In a case where a job could not be normally terminated due to an occurrence of an error as a result of executing the macro by the macro execution module 1001, an error-cause check module 1002 checks the cause of the error of that job. In a case where the error occurs in the macro including the transmission job, it is recognized with this module whether the cause of the error lies in the destination replaced by the reserved word replacing module 304 or lies in something other than that.

The error-cause check module 1002 according to the present embodiment determines only whether the destination replaced by the reserved word replacing module 304 is the cause of the error, but may recognize other causes of the error.

When the error-cause check module 1002 determines that the error has occurred due to the destination in which the reserved words have been replaced, an error-cause warning module (a notification unit) 1003 notifies the user of the error. The occurrence of the error is notified to the user having instructed to execute the macro on the operation unit 230. The occurrence of the error is notified via e-mail to the administrator managing the setting values in the user properties and to the administrator having created the macro. When the error during execution of the macro is caused due to replacing of the reserved word, the generated macro itself does not have any problem, and the cause of the error lies in the user property information with which the reserved word has been replaced. Thus, in such case, it is effective to notify the error during execution of the macro to the administrator managing the user properties in addition to, or rather than, the administrator having created the macro. In this way, changing the recipients of the notification appropriately, the administrator can take a countermeasure promptly after the error occurs.

In the present embodiment, those three people are warned, but for example, only either one of them may be warned. In a case where there exist users registered in duplicate, a duplicate warning may be prevented.

In addition, an interface for switching objects of warning with a switch may be provided to switch the objects of warning according to the setting. In this case, users other than the above-mentioned three people may be included in the objects.

In addition, the creator of macro may be warned only when an error occurs by replacing another user property. In addition, when the error does not occur by replacing another user property but the error occurs only by replacing a specific user property, the administrator managing the setting values of the user properties may be warned.

Figure 11:
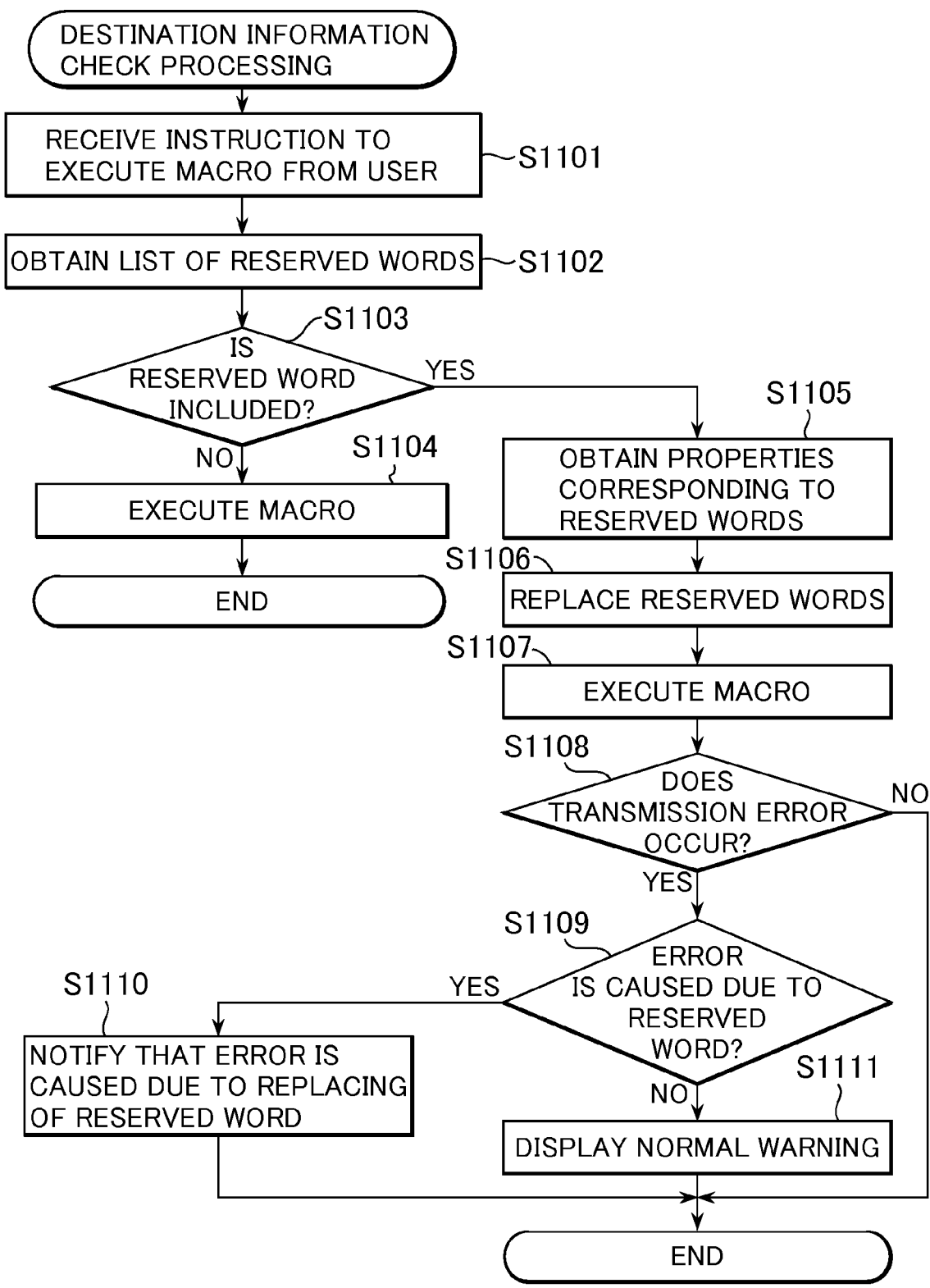
FIG. 11 is a flowchart showing a procedure of a control processing (a destination information check processing) in the multifunctional apparatus having the software configuration of FIG. 10.

FIG. 11 is a flowchart showing a procedure of a control processing (a destination information check processing) in the multifunctional apparatus according to the present embodiment.

The destination information check processing is executed by the CPU 241 of the multifunctional apparatus 101.

The CPU 241 receives an instruction (a command) of execution of the macro input by a user through operation on the operation unit 230 (step S1101, a reception step) It is assumed that the user has already performed a login operation to the multifunctional apparatus 101 before step S1101 is executed. It is also assumed that the CPU 241 can identify a user who is performing operation in step S1101. That is, it is assumed that the CPU 241 has executed a user identification step as a function of a user identification unit, not shown in the figure, before going into the processing of FIG. 11.

Next, the CPU 241 executes the reserved word list acquisition module 301 to obtain a list of the reserved words (step S1102).

Next, the CPU 241 checks whether any reserved word is included in the macro instructed to execute in step S1101 (step 1103). When no reserved word is included (No in step S1103), the CPU 241 executes the macro instructed to execute (step S1104), and terminates the processing.

When the reserved word is included (Yes in step S1103), the CPU 241 executes the processes in step S1105 and subsequent steps.

In addition, the CPU 241 executes the user property acquisition module 303 to obtain the user property information (step S1105, a user information acquisition step). Herein, the user property acquisition module 303 obtains from the user administration server 103 the user property information associated with the user who instructed to execute the macro in step S1101.

Subsequently, the CPU 241 executes the reserved word replacing module 304 to replace the reserved word detected in step S1103 with data corresponding to an item to be replaced among the user property information obtained in step S1105 (step S1106, a replacing step).

Subsequently, the CPU 241 executes the macro instructed to execute in step S1101 (step S1107, a macro execution step).

Subsequently, the CPU 241 checks whether any transmission error has occurred in the transmission job included in the macro executed in step S1107 (step S1108). When the transmission error does not occur (No in step S1108), the CPU 241 simply terminates the processing.

When the transmission error occurs (Yes in step S1108), the CPU 241 executes the error-cause check module 1002 to determine whether the cause of the transmission error lies in the replacing of the reserved word (step S1109). When the replacing of the reserved word is the cause (Yes in step S1109), the CPU 241 executes the error-cause warning module 1003 to notify that the error is caused due to the destination in which the reserved word has been replaced (step S1110), and terminates the processing.

When the cause is not the replacing of the reserved word (No in step S1109), the CPU 241 displays a normal warning showing that the macro instructed to execute in step S1101 has terminated with error (step S1111), and terminates the processing. It should be noted that steps S1110 and S1111 correspond to a notification step for notifying that an error has occurred during execution of the macro.

As described above, normal methods include using the operation unit 230 to notify the user who has instructed to execute the macro and using e-mail to transmit an error message to the administrator who has created the macro and the administrator who manages the user property information.

As hereinabove described, according to the second embodiment, it becomes possible to notify to the user that the cause of failure in executing the macro lies in the reserved word. In addition, it becomes possible to automatically notify to the creator of macro and the setting administrator of the user property that the cause of failure in executing the macro lies in the reserved word.

It is to be understood that the object of the present invention may also be accomplished by supplying a system or an apparatus with a storage medium in which a program code of software that realizes the functions of the above described embodiment is stored, and causing a computer (or CPU or MPU) of the system or apparatus to read out and execute the program code stored in the storage medium.

In this case, the program code itself read from the storage medium realizes the functions of the embodiments described above. Alternatively, in the present invention, by causing an OS (Operating System) running on the computer to perform a part or all of the actual processing based on the instructions in the program code, the functions of the embodiments described above may be realized. In addition, in the present invention, the program code read from the storage medium is written into a memory provided on a function expansion board inserted into the computer or in a function expansion unit connected to the computer. The CPU, or the like provided in the function expansion board or the function expansion unit may perform a part or all of the actual processing based on the instructions in the program code. Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-023875, filed on Feb. 4, 2008 which is hereby incorporated by reference herein in its entirety.

What is claimed is:

1. An image processing apparatus for executing a plurality of functions including an image processing and executing a processing based on a macro indicating a content of the processing including a combination of the plurality of functions, the image processing apparatus comprising:
 a macro acquisition unit adapted to obtain the macro;
 a user information acquisition unit adapted to obtain user information associated with a user of the image processing apparatus;
 a replacing unit adapted to, when the macro obtained by said macro acquisition unit is a macro including a reserved word that is to be replaced with at least a portion of the user information, replace the reserved word with the at least a portion of the user information obtained by said user information acquisition unit;
 a check unit adapted to check whether the macro in which the reserved word has been replaced with the at least portion of the user information by said replacing unit is normally executable; and
 a notification unit adapted to notify a check result of said check unit to a previously defined user,
 wherein said replacing unit is adapted to, when receiving an instruction to check the macro, replacing the reserved word with the at least the portion of the user information corresponding to each of a plurality of users of the image processing apparatus.

2. The image processing apparatus according to claim 1, further comprising:
 a memory unit adapted to store correspondence information indicating a correspondence between each of a plurality of types of reserved words includable in the macro and detailed information in the user information that is to be replaced with by said replacing unit,
 wherein the user information includes a plurality of pieces of detailed information, and said replacing unit replaces the reserved word in the macro with the detailed information referring to the correspondence information.

3. The image processing apparatus according to claim 2, wherein the plurality of pieces of detailed information included in the user information include at least one of an ID identifying the user, information indicating a network domain that the user belongs to, an e-mail address of the user, or a group that the user belongs to.

4. The image processing apparatus according to claim 1, wherein:
the macro includes user identification information for identifying a user that instructs to execute the macro,
said user information acquisition unit obtains one or more pieces of user information identified based on the user identification information,
said replacing unit executes a processing to replace the reserved word using the detailed information included in each of the one or more pieces of user information obtained by said user information acquisition unit, and
said check unit checks whether the macro in which the reserved word has been replaced with the at least portion of the user information is normally executable every time said replacing unit executes the replacing processing.

5. The image processing apparatus according to claim 1, wherein said user information acquisition unit obtains the user information via a network from an external user administration apparatus.

6. The image processing apparatus according to claim 1 further comprising:
a user identification unit adapted to identify a user who operates the image processing apparatus; and
a macro execution unit adapted to execute a processing including a combination of the plurality of functions based on the macro,
wherein when an instruction to execute the macro including the reserved word is received from the user identified by said user identification unit, said replacing unit replaces the reserved word using at least a portion of information of the user information of the user identified by said user identification unit obtained by said user information acquisition unit, and said macro execution unit executes a processing based on the macro in which the reserved word has been replaced with the at least portion of the user information.

7. An image processing apparatus for executing a plurality of functions including an image processing and executing a processing based on a macro indicating a content of the processing including a combination of the plurality of functions, the image processing apparatus comprising:
a macro acquisition unit adapted to obtain the macro;
a user information acquisition unit adapted to obtain user information associated with a user of the image processing apparatus;
a replacing unit adapted to, when the macro obtained by said macro acquisition unit is a macro including a reserved word that is to be replaced with at least a portion of the user information, replace the reserved word with the at least a portion of the user information obtained by said user information acquisition unit;
a check unit adapted to check whether the macro in which the reserved word has been replaced with the at least portion of the user information by said replacing unit is normally executable; and
a notification unit adapted to notify a check result of said check unit to a previously defined user,
wherein said check unit includes a first check unit adapted to check whether information included in the user information is in an appropriate form for replacing the reserved word, and a second check unit adapted to check whether a processing executed according to the macro in which the reserved word has been replaced with the at least portion of the user information by said replacing unit is correctly executable.

8. An image processing apparatus for executing a plurality of functions including an image processing and executing a processing based on a macro indicating a content of the processing including a combination of the plurality of functions, the image processing apparatus comprising:
a user identification unit adapted to identify a user who operates the image processing apparatus;
a reception unit adapted to receive an instruction for executing the macro from the user identified by said user identification unit;
a user information acquisition unit adapted to obtain user information associated with the user identified by said user identification unit;
a replacing unit adapted to, when the macro whose execution instruction is received by said reception unit is a macro including the reserved word that is to be replaced with at least a portion of the user information, replace the reserved word with the at least a portion of information included in the user information obtained by said user information acquisition unit;
a macro execution unit adapted to execute a processing based on the macro in which the reserved word has been replaced with the at least portion of the user information by said replacing unit; and
a notification unit adapted to, when an error occurs in the processing executed by said macro execution unit, notify the occurrence of the error,
wherein said notification unit changes a recipient of the notification depending on whether or not the error is caused due to the replacing of the reserved word by said replacing unit.

9. The image processing apparatus according to claim 8, wherein when the error is caused due to the replacing of the reserved word by said replacing unit, said notification unit notifies the occurrence of the error to an administrator who manages the user information, and when the error is not caused due to the replacing of the reserved word by said replacing unit, said notification unit notifies the occurrence of the error to an administrator who has made the macro.

10. A control method for an image processing apparatus for executing a plurality of functions including an image processing and executing a processing based on a macro indicating a content of the processing including a combination of the plurality of functions, the control method comprising:
a macro acquisition step of obtaining a macro;
a user information acquisition step of obtaining user information associated with a user of the image processing apparatus;
a replacing step of replacing a reserved word with at least a portion of the user information obtained in said user information acquisition step when the macro obtained in said macro acquisition step is a macro including the reserved word that is to be replaced with the at least a portion of the user information;
a check step of checking whether the macro in which the reserved word has been replaced with the at least portion of the user information in said replacing step is normally executable; and a notification step of notifying a check result in said check step to a predetermined user, wherein said replacing step, when receiving an instruction to check the macro, replaces the reserved word with the at least the portion of the user information corresponding to each of a plurality of users of the image processing apparatus.

11. A control method for an image processing apparatus for executing a plurality of functions including an image processing and executing a processing based on a macro indicating a content of the processing including a combination of the plurality of functions, the control method comprising:

a user identification step identifying a user who operates the image processing apparatus;

a reception step of receiving an instruction to execute the macro from the user identified in said user identification step;

a user information acquisition step of obtaining user information associated with the user identified in said user identification step;

a replacing step of replacing a reserved word with at least a portion of information included in the user information obtained in said user information acquisition step when the macro whose execution instruction is received in said reception step is a macro including the reserved word that is to be replaced with at least a portion of the user information;

a macro execution step of executing a processing based on the macro in which the reserved word has been replaced with the at least portion of the user information in said replacing step; and a notification step of notifying an occurrence of an error when the error occurs in an execution of the processing in said macro execution step, wherein said notification step changes a recipient of the notification depending on whether or not the error is caused due to the replacing of the reserved word in said replacing step.

12. A non-transitory computer-readable storage medium storing a control program executable by a computer to execute a control method for an image processing apparatus for executing a plurality of functions including an image processing and executing a processing based on a macro indicating a content of the processing including a combination of the plurality of functions, the control method comprising:

a macro acquisition step of obtaining a macro;

a user information acquisition step of obtaining user information associated with a user of the image processing apparatus;

a replacing step of replacing a reserved word with at least a portion of the user information obtained in said user information acquisition step when the macro obtained in said macro acquisition step is a macro including the reserved word that is to be replaced with the at least a portion of the user information, a check step checking whether the macro in which the reserved word has been replaced with the at least portion of the user information in said replacing step is normally executable; and a notification step of notifying a check result in said check step to a predetermined user, wherein said replacing step, when receiving an instruction to check the macro, replaces the reserved word with the at least the portion of the user information corresponding to each of a plurality of users of the image processing apparatus.

13. A non-transitory computer-readable storage medium storing a control program executable by a computer to execute a control method for an image processing apparatus for executing a plurality of functions including an image processing and for executing a processing based on a macro indicating a content of the processing including a combination of the plurality of functions, the control method comprising:

a user identification step of identifying a user who operates the image processing apparatus, a reception step of receiving an instruction to execute the macro from the user identified in said user identification step;

a user information acquisition step of obtaining user information associated with the user identified in said user identification step;

a replacing step of replacing a reserved word with at least a portion of information included in the user information obtained in said user information acquisition step when the macro whose execution instruction is received in said reception step is a macro including the reserved word that is to be replaced with at least a portion of the user information;

a macro execution step of executing a processing based on the macro in which the reserved word has been replaced with the at least portion of the user information in said replacing step; and a notification step of notifying an occurrence of an error when the error occurs in an execution of the processing in said macro execution step, wherein said notification step changes a recipient of the notification depending on whether or not the error is caused due to the replacing of the reserved word in said replacing step.

* * * * *